United States Patent
Menner et al.

(10) Patent No.: US 6,928,454 B2
(45) Date of Patent: Aug. 9, 2005

(54) METHOD AND SYSTEM FOR COLOR MATCHING DECORATIVE PRODUCTS

(75) Inventors: Joseph L. Menner, Irwin, PA (US); Christopher R. Caruso, Pittsburgh, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 485 days.

(21) Appl. No.: 09/870,073

(22) Filed: May 30, 2001

(65) Prior Publication Data

US 2002/0184232 A1 Dec. 5, 2002

(51) Int. Cl.[7] ............................................. G06F 17/30
(52) U.S. Cl. ........................... 707/104.1; 707/1; 707/3; 345/593
(58) Field of Search ................... 707/1, 3, 10, 104.1; 382/162; 345/593, 967, 968

(56) References Cited

U.S. PATENT DOCUMENTS

| | | | |
|---|---|---|---|
| 4,813,000 A | 3/1989 | Wyman et al. | 364/526 |
| 4,887,906 A * | 12/1989 | Koehler | 356/402 |
| 4,931,929 A * | 6/1990 | Sherman | 705/500 |
| 5,177,694 A | 1/1993 | Graham et al. | 364/526 |
| 5,270,808 A | 12/1993 | Tanioka | 358/527 |
| 5,559,604 A * | 9/1996 | Arai | 356/402 |
| 5,668,633 A | 9/1997 | Cheetam et al. | 356/402 |
| 5,764,795 A | 6/1998 | Takeo et al. | 382/167 |
| 5,798,943 A | 8/1998 | Cook et al. | 364/526 |
| 5,841,421 A | 11/1998 | Cheetam et al. | 345/150 |
| 5,870,771 A | 2/1999 | Oberg | 707/502 |
| 5,909,291 A | 6/1999 | Myers et al. | 358/523 |
| 5,930,387 A | 7/1999 | Chan et al. | 382/166 |
| 6,014,221 A | 1/2000 | Plude, Jr. | 356/402 |
| 6,112,665 A | 9/2000 | Teter et al. | 101/483 |
| 6,122,391 A * | 9/2000 | Ringland et al. | 382/100 |
| 6,137,595 A | 10/2000 | Sakuyama et al. | 358/1.9 |
| 6,137,903 A * | 10/2000 | Dichter | 382/162 |
| 6,157,735 A | 12/2000 | Holub | 382/167 |
| 6,166,814 A | 12/2000 | Pringle | 356/445 |
| 6,459,435 B1 * | 10/2002 | Eichel | 345/588 |
| 6,563,510 B1 * | 5/2003 | Rice et al. | 345/593 |
| 6,572,377 B2 * | 6/2003 | Masters | 434/72 |
| 6,584,465 B1 * | 6/2003 | Zhu et al. | 707/6 |

* cited by examiner

*Primary Examiner*—Greta Robinson
*Assistant Examiner*—Cheryl Lewis
(74) *Attorney, Agent, or Firm*—William J. Uhl (57) ABSTRACT

A method of identifying decorative products based on matching with paint colors. The method includes the use of a relational database having data on various decorative product types which are cross-referenced to each other via color values.

45 Claims, 6 Drawing Sheets

METHOD AND SYSTEM FOR COLOR MATCHING DECORATIVE PRODUCTS

BACKGROUND OF THE INVENTION

1. Field of the Invention

The present invention relates to a method and system for matching decorative products based on color, more particularly, for matching one type of decorative product to other types of decorative products by matching each product with a paint color.

2. Prior Art

Color coordinating of decorative products such as wallpaper, fabrics, floor coverings, and window treatments to each other and to paints, is typically performed by the consumer or a professional decorator by the eye. A swatch of wallpaper, fabric, or the like is compared to an array of paint chips to determine which paint closely matches the background or accent colors in the swatch to be matched. The same type of process must be repeated to coordinate the swatch of wallpaper to a swatch of carpeting. The identification of matching colors is subject to uncontrolled variables, such as the viewers eye and the lighting conditions. For each type of decorative product, there are numerous catalogs and sample books displaying the products which must be paged through by hand to locate all possible matching products. There is no uniform system of referencing or matching products from one decorative type (e.g., wallpaper) to another decorative product type (e.g., carpeting) because each manufacturer and each industry for the separate decorative product types maintain separate catalogs and sample books and rely upon the end user or professional decorator to coordinate the products. While some manufacturers provide products which are promoted as coordinating with other products within a certain style grouping, the ability to match a product provided by one manufacturer to a different product type produced by yet another manufacturer is limited.

One solution to the problem of matching a sample of a decorative product to paints is described in U.S. Pat. No. 4,813,000 which discloses a method of matching a selected color with predetermined available paint colors. A portable calorimeter is used to analyze the selected color of an unknown sample and store the chromaticity data (hue, chroma, and brightness) for the selected color. The stored chromaticity data is coupled to a computer. The computer also stores chromaticity data for a set of paint formulas. The computer then selects the stored paint formula having chromaticity data which most closely matches the chromaticity data of the unknown sample. This system provides a method of matching a single, unknown sample (e.g., a swatch of wallpaper) to a known set of paint formulas. However, it does not allow for identification of other decorative product types beyond paint which would match the unknown sample. Moreover, every practice of the method requires the use of a calorimeter and access to a link between the calorimeter and a computer storing the paint database.

Another system for color matching decorative products is described in U.S. Pat. No. 6,122,391. In that system, the colors of decorative products are determined spectrophotometrically and are assigned a Pantone color best matching the colors of the products. Several product types, including wallpaper, drapery fabric, floor coverings, and paint, are stored in computer databases with a Pantone color associated for each of the products. Via a computer, a user selects one decorative product type (e.g., wallpaper) and identifies a style therefor (e.g., traditional or contemporary), a pattern type, and the computer presents a screen of potential colors. The colors are a condensed version of the approximately 1,700 Pantone available colors, and the user selects one of the colors appearing on the computer screen. The wallpaper database is then searched and a display of wallpapers which match the color and style selected by the user is presented. The user chooses one wallpaper and may then search other decorative products, such as paint. The paints are identified as those which match the Pantone colors found in the selected wallpaper. Finally, the computer presents a representation of a room decorated with each of the decorative products identified in the system. This system requires that each of decorative products available from one or more manufacturers is matched with a Pantone color. The Pantone color is used as the reference for matching one decorative product to another decorative product. A drawback to this system is that the user must first select a color based on a computer representation of Pantone colors. The ability to accurately represent colors on a computer screen remains problematic. Color quality can be affected by the computer hardware and operating system. A color presented on a computer screen is often not a true representation of the actual color, hence, the products selected by the system may not actually be the color desired by the user. In addition, although the system allows for selection of multiple product types (wallpaper, paint, etc.), the user must initiate the search from a single color choice. There is no mechanism for matching a preselected product to other decorative products.

Accordingly, a need remains for a method and apparatus for matching commercially available decorative products based on a preselected decorative product by a user which is simple to use and readily accessible.

SUMMARY OF THE INVENTION

The present invention relates to a method of selecting one or more decorative products based on color and to an apparatus for practicing the method. A relational database containing a plurality of decorative product databases is provided, each decorative product database including data on one decorative product type, such as paints, wallpaper, fabrics, floor coverings, and window treatments. The relational database is stored on a computer which preferably is remotely accessible via a computer network including the Internet. Each decorative product listed in the databases has a color value, such as an $L^*a^*b^*$ measurement, associated therewith. A decorative product in one database (e.g., a paint) is coordinated with at least one other decorative product in another database (e.g., a wallpaper) by selecting the wallpaper having a color value which most closely matches the color value for the paint according to an algorithm. The system may also identify products having complementary colors or contrasting colors. The databases may contain additional information on the decorative products listed therein, such as supplier name, price, or product code. The algorithm for identifying coordinating decorative products may be modified to select for a characteristic of the additional information.

Another embodiment of the invention includes a relational database having a first paint database containing color data and one or more other decorative product databases containing data on other types of decorative products. The data on the other types of decorative products also includes data on paints having colors relating to the colors of the decorative products in the other decorative product databases. A preselected decorative product is located in one of the databases, and paint data relating to the preselected decorative product is identified. The other decorative product databases are searched for the related paint data. When one or more matches with the related paint data is located in another database, a decorative product(s) which also relates to the related paint data of the preselected product is identified as coordinating with the preselected product.

The preselected decorative product may be a product listed in the relational database for which related paint data is provided. Alternatively, the preselected decorative product may be an unknown product not listed in the relational database. In that case, the color value of the unknown product is determined. The color value is matched with a paint contained in the relational database to a preselected degree. The relational database is searched for paint data for the unknown product to identify decorative products that also relate to the paint data of the unknown product. All decorative products listed in the relational database which relate to the paint data of the unknown product are considered to be color matched with the unknown product.

A complete understanding of the invention will be obtained from the following description when taken in connection with the accompanying drawing figures wherein like reference characters identify like parts throughout.

BRIEF DESCRIPTION OF THE DRAWINGS

FIG. 2b is a flow diagram of a method of selecting a decorative product using the relational database shown in FIG. 2a;

FIG. 3b is a flow diagram of a method of selecting a decorative product using the relational database shown in FIG. 3a;

FIG. 4 is a flow diagram of another method of selecting a decorative product using the relational database shown in FIG. 2a; and FIG. 5 is a flow diagram of another method of selecting a decorative product using the relational database shown in FIG. 3a.

DESCRIPTION OF THE PREFERRED EMBODIMENTS

For purposes of the description hereinafter, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention.

The present invention relates generally to a method and apparatus for selecting a decorative product based on the color of the product. In the following discussion, the method and apparatus are explained with reference to selecting the decorative product based on paint color. However, it is to be understood that this is an exemplary use of the invention and should not be considered as limiting. The method and apparatus of the invention can be practiced in a variety of fields, such as the matching of apparel and fashion products.

Figure 1:
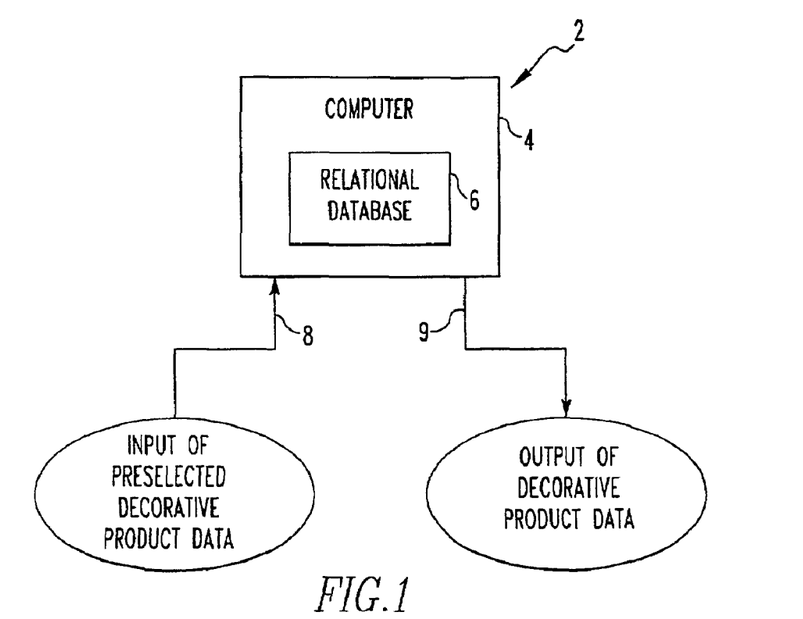
FIG. 1 is a schematic, block diagram of the system of the present invention including a relational database.
Figure 2A:
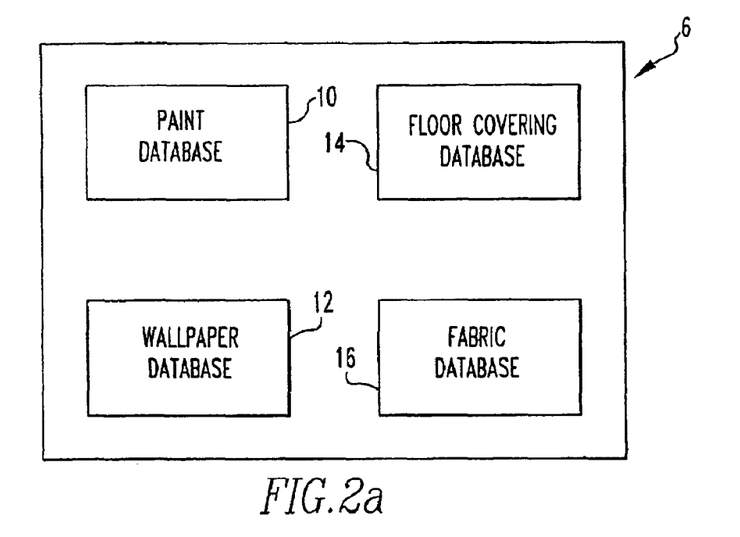
FIG. 2a is a schematic, block diagram of the relational database shown in FIG. 1.

An exemplary system 2 is schematically shown in FIG. 1. The system 2 includes a computer 4 containing a relational database 6. The system 2 may be a portion of a computer network, such as the Internet. The computer 4 includes an input 8 for identifying a preselected decorative product and an output 9 for identifying coordinating decorative product(s). By the term coordinating, it is meant matching colors, complementary colors, and contrasting colors. The relational database 6 is shown schematically in FIG. 2a as including decorative product databases 10, 12, 14, and 16. Each decorative product database includes products of one type. In FIG. 2a, decorative product databases 10, 12, 14, and 16 are identified as a paint database, wallpaper database, a floor covering database, and a fabric database, respectively. These product types are exemplary only. Other decorative products could be listed in other decorative product databases, such as window treatments, towels, accent products (e.g., clocks and lamps), and artwork or picture frames. Each decorative product database includes data on products and color data on at least one color value for a color of the product. Preferably, the color value includes the hue, chroma, and brightness of the product and may be a measurement of L*a*b*. The color values preferably are determined using a calorimeter, preferably a spectrophotometer. For certain products, such as wallpaper and fabrics, the color data may include a plurality of color values. In the case of wallpaper, the background may have one color value while the pattern has one or more color values. The color data for a multi-colored product includes information for each color value of separate portions of the multi-colored product background, pattern, border, and the like. The decorative product databases 10, 12, 14, and 16 may contain additional information on the products, such as supplier, product name, price, product code, style (e.g., contemporary or juvenile), size, and the like.

In operation, a user preselects a decorative product listed in the relational database 6 and inputs an identification for the product at 8. The preselected decorative product is a product selected by a user of the system 2 for which coordinating decorative products are sought. Upon input of the preselected decorative product, the computer 4 identifies the type of product and locates the preselected decorative product in one of the decorative product databases 10, 12, 14, or 16. The computer identifies the color data for the preselected decorative product and searches one or more of the other decorative product databases 10, 12, 14, or 16 for color data that most closely matches the color data for the preselected product.

The computer 4 includes software for performing an algorithm to determine which products in each of the databases 10, 12, 14, and 16 have a color value which most closely matches the color value in another of the databases 10, 12, 14, and 16. The degree of matching (closeness of the match) may be fixed by the algorithm or may be adjustable upon the user's request. When a product in one of the other databases is identified as having a best color data match, that product is identified at the output 9. More than one product in a single database and more than one product of more than one product type may be determined to have a color data match with the color data of the preselected decorative product. If so, all such coordinating products are identified at the output 9. The algorithm may be adjusted by the user to only select for one product type such that the computer 4 searches for a best color data match in only one of the decorative product databases 10, 12, 14, or 16. Other selection criteria which may be used to modify the algorithm by a user including product characteristics, such as supplier, product name, price, product code, style, size, or the like. The system 2 preferably includes components which allow a user to toggle on and off for these search criteria. For example, a user may only wish to identify products from one supplier. The algorithm is adjusted so that only products from that one supplier are identified at output 9.

The user may also request that the computer 4 search for color data matches for a certain location of a multi-colored decorative product. For example, when a match with the pattern in a wallpaper is desired, the user has an opportunity to narrow the search for only decorative products having color data which match with the pattern portion of the wallpaper. Alternatively, all color data of the separate portions of a multi-colored decorative product may be searched for matches in the relational database 6.

The system 2 may also be used to identify decorative products having a color which complements or contrasts with a color of a preselected decorative product. Complementary colors are colors which have an attractive appearance together, while contrasting colors typically have a more striking appearance when placed together. The determination of complementary colors or contrasting colors may be made by the algorithm. More preferably, because the relationship between color values of complementary and contrasting colors is not necessarily mathematical, the determination may be made by a color expert and included in the system 2 as fixed rules in the algorithm. A user may request that the computer 4 search only for complementary colors or matching and complementary colors or other such combinations of criteria.

Accordingly, it will be appreciated that the system 2 may be adjusted to search for a maximum number of coordinating decorative products or a subset thereof determined by a user's search criteria.

The relational database 6 may be updated as additional products become available. New products may be listed along with the color data therefor and any additional product information.

Figure 2B:
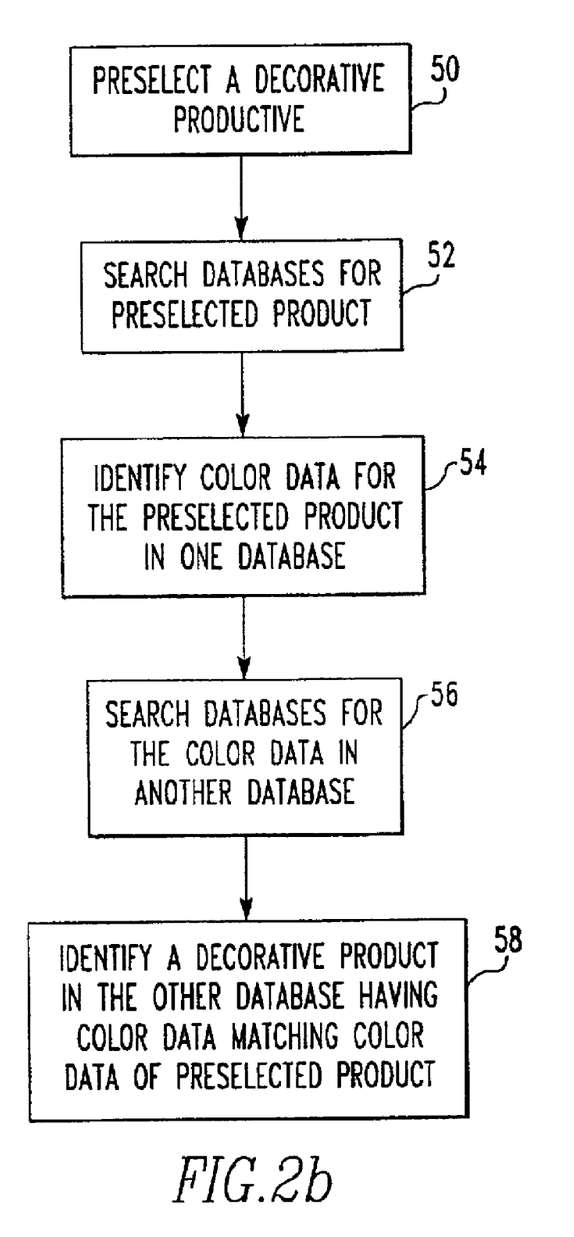

FIG. 2b is a flow diagram of a method of identifying decorative product according to the present invention. According to the method of the present invention, a user preselects a decorative product in step 50. The decorative product is one of the products that is listed in one of the decorative product databases 10, 12, 14, and 16 of FIG. 2a. Data on the decorative product is inputted into the computer 4 and, in step 52, the computer 4 searches the databases for the preselected product and locates the preselected product. In step 54, the computer identifies the color data of the preselected product in one of the databases. The computer searches in step 56 for the color data in other of the decorative product databases of the relational database 6. In step 58, one or more decorative products are identified in the other database having color data that matches (or meets the search criteria of the user) for the color data of the preselected product. This identified decorative product(s) is deemed to coordinate with the preselected product.

Figure 3A:
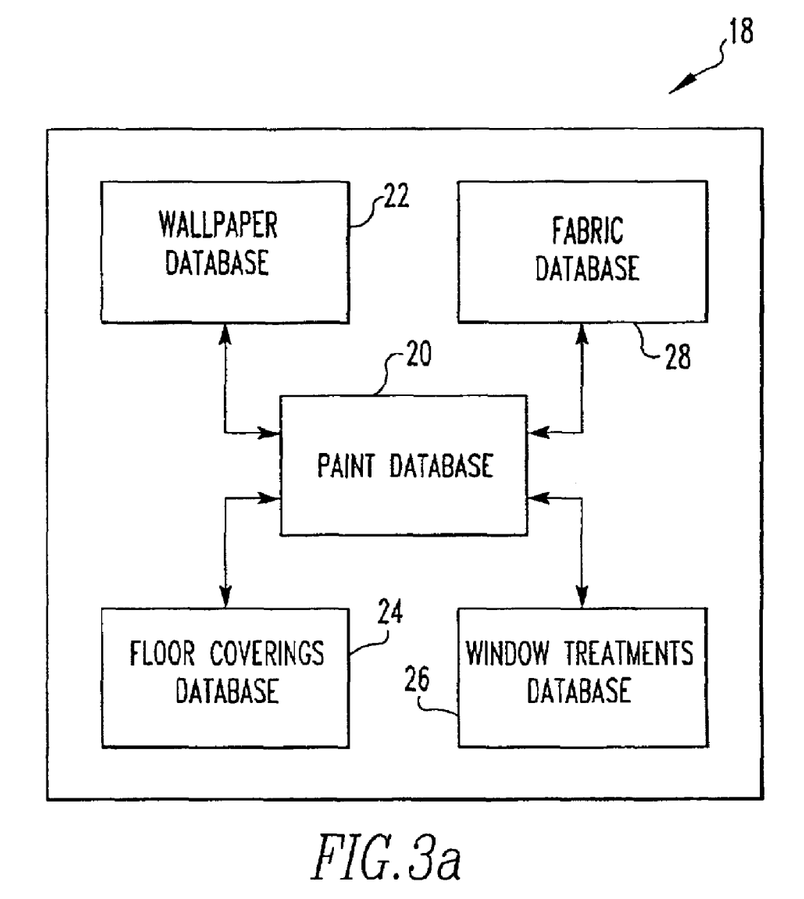
FIG. 3a is a schematic, block diagram of another embodiment of a relational database for use in the system shown in FIG. 1.

Another embodiment of a relational database of the present invention is depicted schematically in FIG. 3a. The relational database 18 includes a first database 20 containing paint data. The paint database 20 includes data on commercially available paints produced by or available from at least one paint supplier. The paints described herein are interior architectural paints, but this is not meant to be limiting. While there is a need to match interior architectural paints with other interior decorative products, the present invention is applicable to matching of exterior products, such as exterior architectural paints, siding, roofing, and the like.

The paint color database 20 contains a list of all paints, preferably by color and paint name, provided by a primary paint supplier. The paint color database 20 may include one or more lists of paints available from secondary paint suppliers. The data on paint available from secondary paint suppliers includes information relating to the paint from the primary paint supplier so that the paints available from the secondary paint suppliers are cross-referenced to the paints available from the primary paint supplier. The cross-reference is based on the closest chromaticity match between each paint from the secondary paint supplier to a paint from the primary paint supplier. Thus, the database 20 may include data on paint from a secondary paint supplier with related paint data, the related paint data being the closest color match to a paint from the primary paint supplier.

The relational database 18 further includes one or more other decorative product databases 22, 24, 26, and 28. Each other decorative product database includes products of one type. In FIG. 3a, second decorative product databases 22, 24, 26, and 28 are identified as a wallpaper database, a floor covering database, a fabric database, and a window treatment database, respectively. As for the relational database 6, other decorative products could be listed in other decorative product databases of the relational database 18. Each of the decorative product databases 22, 24, 26, and 28 includes a list of decorative products for the respective product type and may include products available from one or more suppliers.

The data for each decorative product in the relational database 18 includes information on the respective decorative product and related paint data on paint that matches a color of each decorative product. In the paint database 20, the related paint data for paint from the primary supplier is information on the paint itself, such as the paint name (e.g., "Glassy Blue") or product code (e.g., UPC or Universal Product Code). The related paint data for paint available from secondary suppliers is the cross-referenced paint data on paint from the primary supplier. For the second decorative product databases 22, 24, 26, and 28, the related paint data is the paint from the primary supplier which coordinates with the colors of the products in the databases 22, 24, 26, and 28. In this manner, the link between each of the databases 20, 22, 24, 26, and 28 in the relational database 6 is the paint data of a single paint manufacturer, the primary paint supplier. Each decorative product listed in the relational database 18 has related paint data (a paint from the primary supplier) associated therewith.

The relational database 18 is constructed by listing each decorative product and related paint data for each decorative product in the databases 20, 22, 24, 26, and 28. This requires that a color analysis of each decorative product be made to determine a paint from the primary paint supplier which best matches each decorative product. The chromaticity (or other color defining property) of a decorative product is matched as best as possible to the known chromaticity of the paints from the primary supplier. In particular, the color value of each decorative product in the databases 22, 24, 26, and 28 is determined, preferably using a colorimeter, preferably, a spectrophotometer. The color value of each decorative product is matched to a preselected degree with the color value of a paint color of paint from the primary supplier. In this manner, a paint from the primary supplier is related to each decorative product. The databases 20, 22, 24, 26, and 28 store data on each decorative product and data related thereto on the paint color from the primary paint supplier which best matches the decorative products listed therein.

The decorative product databases 20, 22, 24, 26, and 28 each have data on the decorative products and on related paint data. For some decorative products, more than one paint from the primary supplier may by related thereto. For example, wallpaper may have a background color as well as accent colors for the pattern in the wallpaper. Accordingly, each wallpaper product listed in the wallpaper database 22 has at least one related paint data, preferably more than one related paint data, most preferably related paint data for the background color and related paint data for each of three accent colors.

The data for each decorative product listed in the relational database 18 at least includes an identification of the decorative product and may further include other information such as supplier, price, product code, product name, style, size, or the like. Preferably, the data for each product listed in each of databases 20, 22, 24, 26, and 28 uses one identification system (e.g., product code) which is input to the computer 4 and searchable therein. The information provided at the output 9 includes the identification data and may include the additional information such as price or supplier.

The computer 4 includes software to perform an algorithm for locating a selected product in the databases 20, 22, 24, 26, and 28 and matching the related paint data of the paint database 20 to the related paint data in each of the decorative product databases 22, 24, 26, and 28. The input 8 to the computer 4 receives data on a preselected decorative product. The preselected decorative product is a product selected by a user of the system for which coordinating decorative products are sought. Upon input of data on the preselected decorative product, the computer identifies the type of product and categorizes the preselected decorative product as one of the types of decorative products in decorative product databases 20, 22, 24, 26, and 28.

If the preselected decorative product is paint, the computer identifies the preselected decorative product data as being a paint and locates the paint data for the preselected decorative product data in the paint color database 20. For a preselected decorative product that is paint from the primary supplier, the computer 4 identifies the related paint data therefor and searches for the related paint data of the preselected decorative product data in each of the decorative product databases 22, 24, 26, and 28. When a match to the related paint data is made, the computer 4 then identifies the decorative products which relate to the matched related paint data in one or more of the decorative product databases 22, 24, 26, and 28. The identified decorative product data is then outputted at 9.

The preselected decorative product may be a paint from a secondary supplier. The computer 4 locates the paint in the database 20. The related paint data for paints from a secondary supplier is paint data from the primary supplier. The computer 4 identifies the related paint data (paint from the primary supplier) cross-referenced to paint from the second supplier in the paint color database 20. Once the related paint data (a paint from the primary supplier) is identified, the computer 4 searches for other decorative products in each of the decorative product databases 22, 24, 26, and 28 for which the related paint data is the same as the related paint data for the preselected product.

When the preselected decorative product is a product other than paint, the computer 4 searches the decorative product databases 22, 24, 26, and 28 for data on the preselected decorative product. The preselected decorative product data is located in one of the databases 22, 24, 26, and 28. For purposes of example only, the following discussion considers location of the preselected decorative product in the wallpaper database 22. Upon location of the preselected decorative product in the wallpaper database 22 by the computer 4, paint data relating to the decorative product data (the wallpaper data) in the wallpaper database 22 is identified. The computer then matches the identified related paint data (a paint from the primary supplier) from the wallpaper database to paint data in each of the decorative product databases 24, 26, and 28 as well as to the paint data in the paint color database 20. Products in the other decorative product databases 24, 26, and 28 and paint in the paint color database 20 are identified which have the same related paint data as the preselected wallpaper product. The computer outputs the identified decorative products to the output 9.

It will be appreciated that the system of the present invention is designed to provide information on coordinating decorative products based on paint colors available from a single paint manufacturer. The paint data from a single paint manufacturer is the link between each of the decorative product databases 20, 22, 24, 26, and 28 of the relational database 18. The relational database 18 may be updated as additional products become available for the decorative product databases 22, 24, 26, and 28 and new paints are developed for the paint database 20. For example, when a new paint becomes available, the paint data therefor is stored in the paint database 20. Coordinating decorative products in each of the decorative product databases 22, 24, 26, and 28 are determined. The related paint data for the coordinating decorative products in the databases 22, 24, 26, and 28 is updated to include data on the new paint.

Figure 3B:
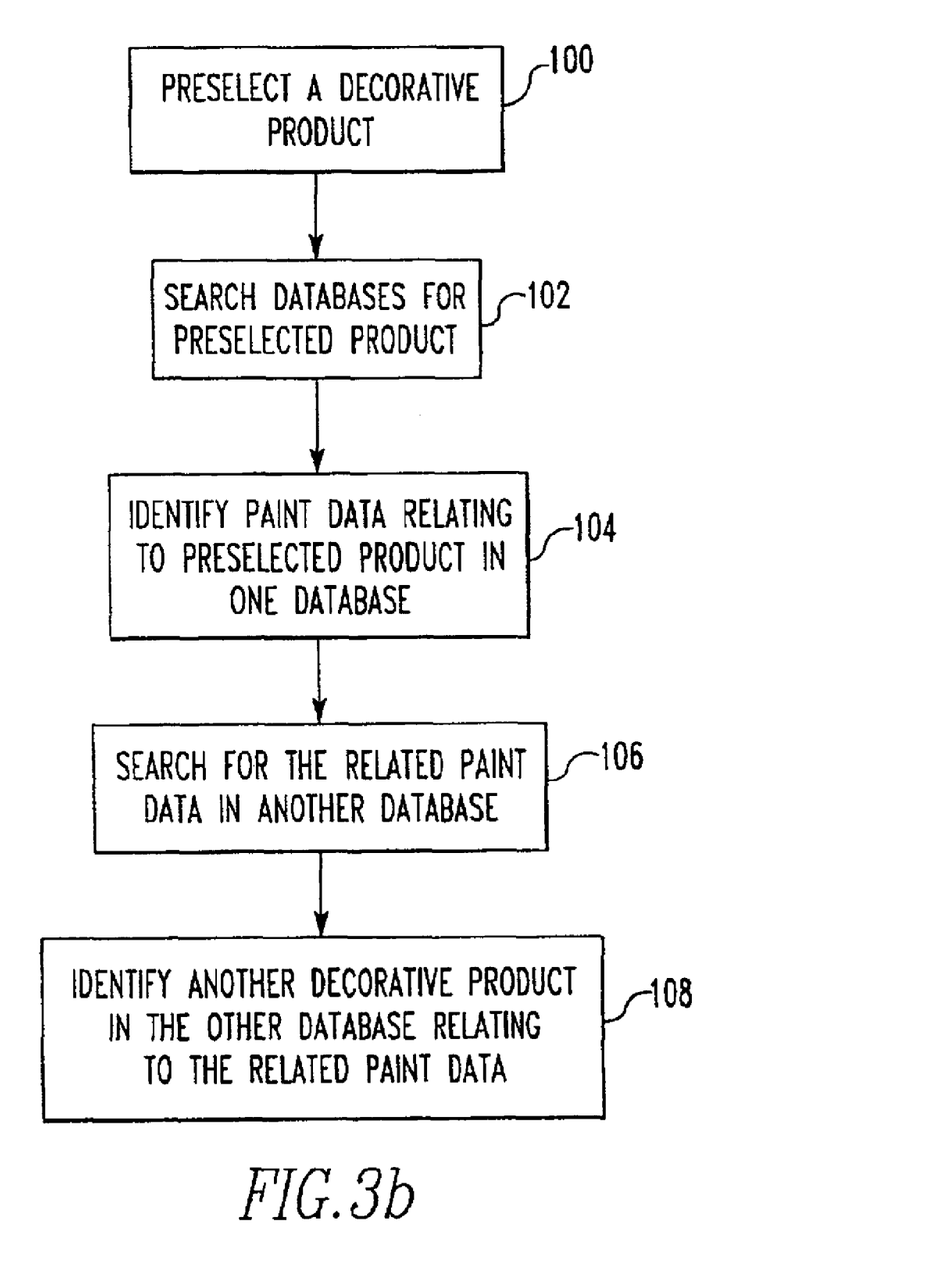

FIG. 3*b* is a flow diagram of another method of identifying decorative product according to the present invention using the relational database 18. According to the method of the present invention, a user preselects a decorative product in step 100. The decorative product is one of the products which is listed in one of the decorative product databases 20, 22, 24, 26, and 28 of FIG. 3*a*. The decorative product is inputted into the computer 4 and, in step 102, the computer searches the databases for the preselected product and locates the preselected product. In step 104, the computer identifies paint data which relates to the preselected data product in one of the databases. Once the paint data for the preselected product is identified, the computer searches in step 106 for the related paint data in other of the decorative product databases of the relational database 6. In step 108, one or more decorative products are identified in the other database which also reference the related paint data. This identified decorative products are deemed to coordinate with the preselected product.

An advantage of these embodiments of the present invention is that selection of decorative products does not require the use of a color measuring device, such as a calorimeter or a spectrophotometer. Instead, the relational databases 6 and 18 contain all the data needed to cross-reference color coordinated decorative products based on color value and paint color, respectively. The user need not rely upon the colors present on a computer screen to identify matching or suitable colors.

Figure 4:
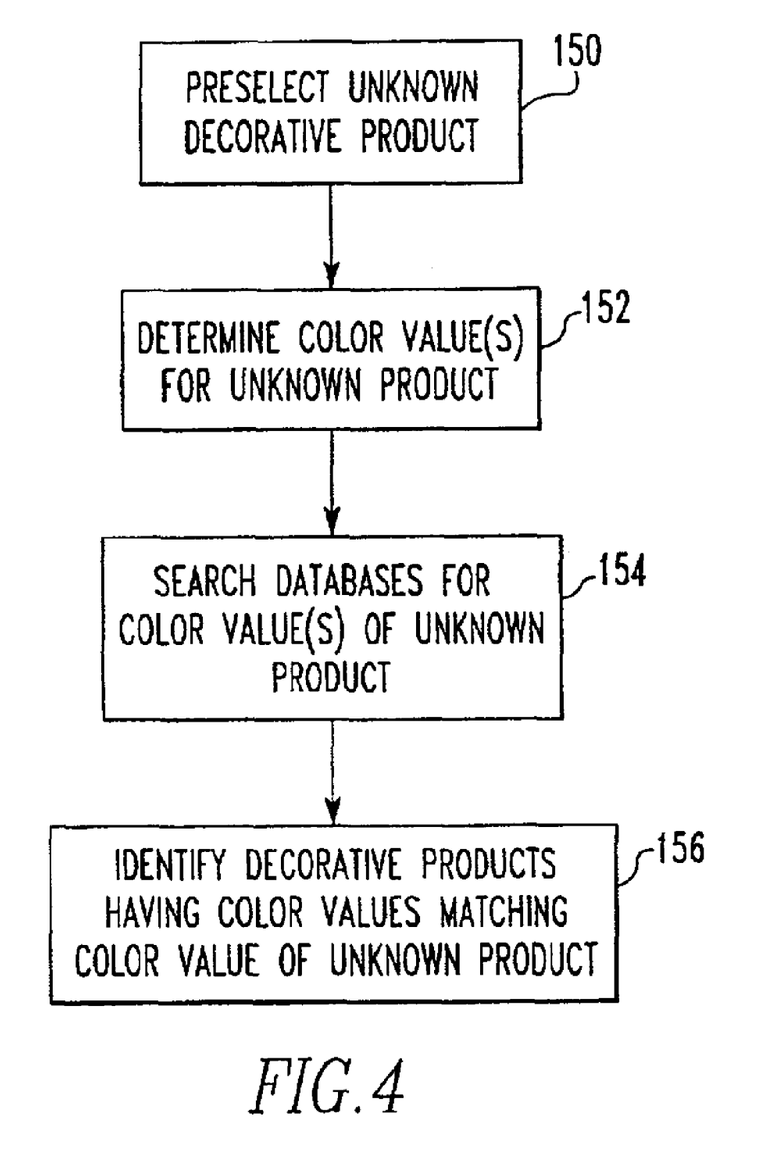
Figure 5:
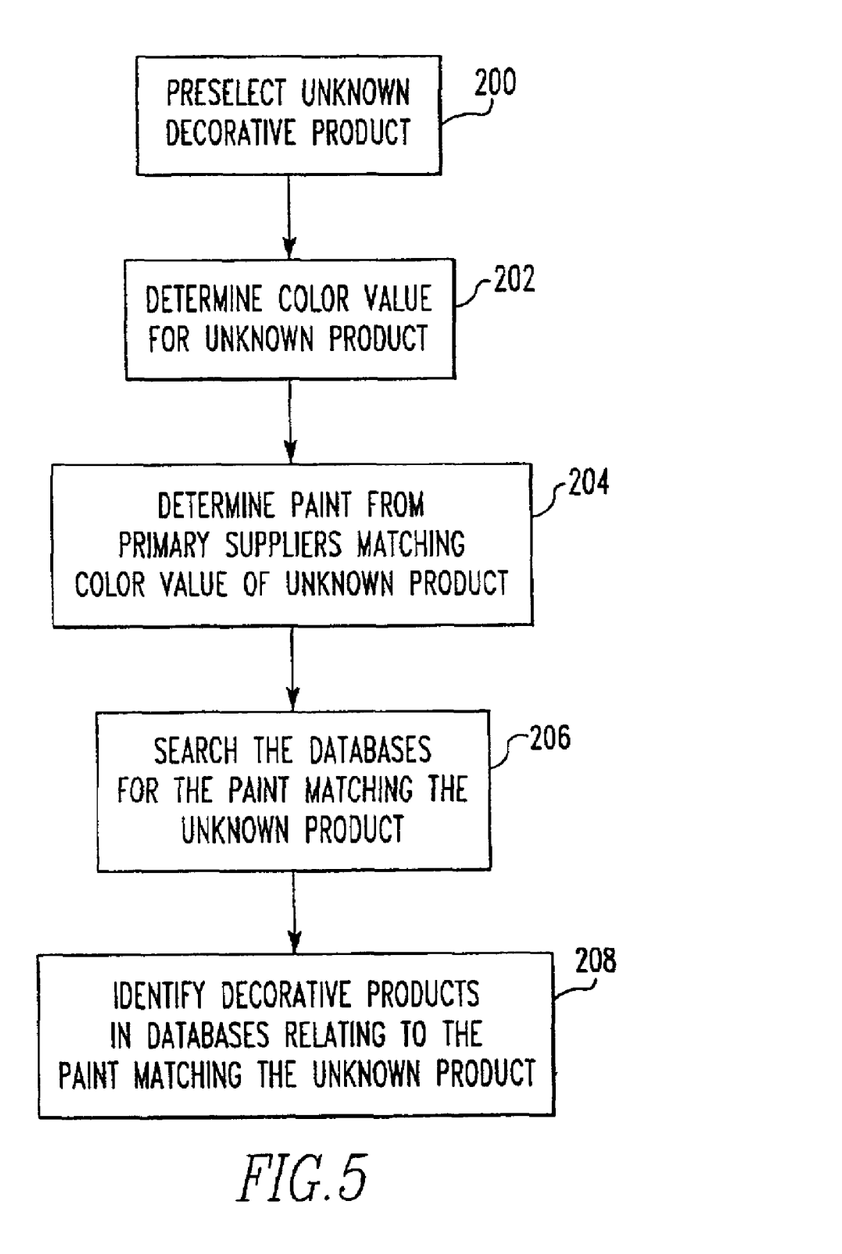

The system 2 of the present invention may also be used to identify decorative products that match with a decorative product not listed in the relational databases 6 or 18. As shown in the flow diagram of FIG. 4, a user preselects in step 150 an unknown decorative product, such as a swatch of a wallpaper. Using a calorimeter that may be a spectrophotometer, the color value of the unknown product is measured in step 152. The color value of the unknown product is inputted at 8 to the computer 4. One or more matches to a color value in the relational database 6 is determined in step 154. The computer 4 identifies decorative products having color values closely matching the color value of the unknown product in step 156. The identified decorative products are output at 9. Alternatively, as shown in the flow diagram of FIG. 5, a user preselects in step 200 an unknown decorative product. The color value of the unknown product is measured in step 202. The closest match to a paint from the primary supplier is determined in step 204. The matched paint from the primary supplier is input at 8 to the computer 4. The computer 4 searches the databases 22, 24, 26, and 28 for the matched paint in step 206 and identifies decorative products therein which have related paint data of the paint matching the unknown product in step 208. The identified decorative products are output at 9.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

We claim:

1. A method of selecting one or more decorative products based on color comprising the steps of:
   (1) providing a plurality of decorative product databases, each said database containing product data on one type of decorative product and color data comprising a color value for each decorative product;
   (2) selecting at least one decorative product in one or more of the databases;
   (3) identifying the color data of the decorative product(s) selected in step (2);
   (4) searching the databases of step (1) for decorative products different than those selected in step 2 and having a coordinating color based on the color data identified in step (3); and
   (5) identifying one or more decorative products in the other databases of step (1) which have color values which coordinate with the color value of the decorative product(s) selected in step (2).

2. The method of claim 1 in which the databases are in digital form and stored in a computer.

3. The method of claim 2 in which the databases are accessible via a computer network.

4. The method of claim 2 in which the searching function is done on a computer.

5. The method of claim 2 in which step (5) is done through the aid of an algorithm.

6. The method of claim 1 in which the color value of the decorative product(s) in step 3 is determined with a spectrophotometer.

7. The method of claim 1 in which at least one of the decorative product databases contains data on paints.

8. The method of claim 7 in which at least one other decorative product database contains data on products selected from the group consisting of wallpaper, fabric, floor coverings, and window treatments.

9. The method of claim 1 in which the color value comprises the hue, chroma, and brightness of the product.

10. The method of claim 9 in which the color value comprises an L*a*b* measurement of the product.

11. The method of claim 1 in which the decorative product(s) identified in step (5) has a color value which best matches the color value of the decorative product(s) selected in step (2).

12. The method of claim 1 in which the decorative product(s) identified in step (5) has a color value for a color that complements or contrasts with the color for the color value of the decorative product(s) selected in step (2).

13. The method of claim 1 in which the databases of step (1) contain additional information on the decorative products comprising product supplier, price, product code, size, or style.

14. The method of claim 13 in which step (5) includes identifying the additional information for the coordinating decorative product(s).

15. The method of claim 13 in which step (5) identifies a decorative product(s) from a single supplier.

16. The method of claim 13 in which step (5) identifies a decorative product(s) having a price within a predetermined price range.

17. A system for coordinating decorative products based on color comprising:
   (1) a plurality of databases, each said database containing product data on one type of decorative product and color data comprising a color value for each decorative product;
   (2) means for determining the color value of at least one selected decorative product in one or more of said databases of component (1);
   (3) means for searching another database of component (1) for a decorative product having a color value coordinating with the color value of a selected product; and
   (4) means for identifying one or more decorative products in the other databases of component (1) which has a color which coordinates with the color of the selected decorative product(s).

18. The system of claim 17 in which the databases are stored in digital form in a computer.

19. The system of claim 18 in which the databases are accessible via a computer network.

20. The system of claim 17 in which the means for searching the databases is a computer.

21. The system of claim 17 in which the means for identifying a decorative product comprises an algorithm.

22. The system of claim 17 in which the means for determining the color value of a selected decorative product(s) in component (2) is a spectrophotometer.

23. The system of claim 17 in which at least one of the decorative product databases contains data on paints.

24. The system of claim 22 in which at least one other decorative product database contains data on products selected from the group consisting of wallpaper, fabrics, floor coverings, and window treatments.

25. The system of claim 17 in which the color value comprises the hue, chroma, and brightness of the product.

26. The system of claim 25 in which the color value comprises an L*a*b* measurement of the product.

27. The system of claim 17 in which said component (3) searches for a decorative product(s) having a color value which best matches the color value of a decorative product(s) determined by component (2).

28. The system of claim 17 in which said component (3) searches for a decorative product(s) having a color which complements or contrasts with the color of the selected product(s).

29. The system of claim 17 in which the databases of component (1) contain additional information on the decorative products comprising product supplier, price, product code, size, or style.

30. The system of claim 29 in which component (4) identifies the additional information for the coordinating decorative product(s).

31. The system of claim 29 in which component (4) identifies a decorative product(s) from a single supplier.

32. The method of claim 29 in which component (4) identifies a decorative product(s) having a price within a predetermined price range.

33. A method of selecting one or more decorative product(s) based on color comprising the steps of:
  (1) providing a paint database containing color data;
  (2) providing at least one other database including (i) data on decorative products other than paint and (ii) related paint data on paints having colors coordinating with the colors of the decorative products in the other database(s);
  (3) searching for a preselected decorative product in one of the paint or other decorative product databases;
  (4) identifying the related paint data for the preselected decorative product;
  (5) searching the other decorative product database for the related paint data identified in step (4); and
  (6) identifying another decorative product in the other decorative product database having the related paint data identified in step (4).

34. The method of claim 33 in which the other decorative product types are selected from the group consisting of wallpaper, fabrics, floor coverings, and window treatments.

35. The method of claim 33 in which the related paint data of step (4) includes identification information on paint from a primary supplier.

36. The method of claim 35 in which the first database contains data on paint from the primary supplier and data on paint from at least one secondary supplier.

37. The method of claim 36 wherein the related paint data for paint from the secondary paint supplier comprises the identification information on paint from the primary supplier.

38. A system for coordinating decorative products based on color comprising:
  (1) a first paint database containing data on color;
  (2) at least one other decorative product database containing (i) data on another type of decorative product(s) and (ii) related paint data on paints having colors coordinating with the colors of the decorative products in the other database(s);
  (3) means for searching for a preselected decorative product in one of said databases;
  (4) means for identifying the related paint data for the preselected decorative product; and
  (5) means for matching the related paint data of the preselected decorative product with paint data of one or more other decorative products in said other decorative product databases to select one or more decorative products that coordinate with the preselected decorative product.

39. The system of claim 38 in which said product types of the other databases are selected from the group consisting of wallpaper, fabrics, floor coverings, and window treatments.

40. The system of claim 38 wherein said paint data includes identification information on paint from a primary supplier.

41. The system of claim 40 in which said paint database contains data on paint from the primary supplier and data on paint from at least one secondary supplier.

42. The system of claim 41 in which the related paint data for the secondary supplier paint comprises said identification information on paint from the primary supplier.

43. The system of claim 38 in which said related paint data for said second databases includes information on a plurality of paints.

44. The system of claim 43 in which said related paint data on a plurality of paints corresponds to a plurality of colors in one product in one of said second databases.

45. The system of claim 44 in which one of said colors is a background color in said product and another of said colors is an accent color in said product.

* * * * *